US011728880B2

(12) United States Patent
Kumar et al.

(10) Patent No.: US 11,728,880 B2
(45) Date of Patent: Aug. 15, 2023

(54) RELAYING BROADCAST MESSAGES TO OUT-OF-COVERAGE USER EQUIPMENT

(71) Applicant: QUALCOMM Incorporated, San Diego, CA (US)

(72) Inventors: Satish Kumar, Hyderabad (IN); Sarath Pinayour Chandrasekaran, Hyderabad (IN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/480,478

(22) Filed: Sep. 21, 2021

(65) Prior Publication Data

US 2023/0092369 A1    Mar. 23, 2023

(51) Int. Cl.
*H04B 7/15* (2006.01)
*H04B 7/155* (2006.01)

(52) U.S. Cl.
CPC ................. *H04B 7/15507* (2013.01)

(58) Field of Classification Search
CPC .................................. H04B 7/15507
See application file for complete search history.

(56) References Cited

U.S. PATENT DOCUMENTS

| 2018/0115362 | A1* | 4/2018 | Yasukawa | H04B 7/15507 |
| 2019/0075447 | A1* | 3/2019 | Lee | H04W 8/20 |
| 2022/0095411 | A1* | 3/2022 | Lin | H04W 76/27 |
| 2022/0109969 | A1* | 4/2022 | Qaisrani | H04W 4/029 |
| 2022/0295375 | A1* | 9/2022 | Wang | H04W 40/22 |
| 2022/0312535 | A1* | 9/2022 | Wu | H04W 8/005 |
| 2022/0337990 | A1* | 10/2022 | Ebrahim Rezagah | H04W 88/04 |
| 2022/0338092 | A1* | 10/2022 | Wang | H04W 92/18 |

* cited by examiner

*Primary Examiner* — Hashim S Bhatti
(74) *Attorney, Agent, or Firm* — Holland & Hart LLP

(57) ABSTRACT

Methods, systems, and devices for wireless communications are described. Aspects of the present disclosure relate to an in-coverage user equipment (UE) relaying broadcast messages to out-of-coverage UEs using one or more messaging techniques over a sidelink channel. The in-coverage UE may monitor for broadcast messages to relay the broadcast messages to out-of-coverage UEs. In some cases, the in-coverage UE may determine to relay broadcast messages to the out-of-coverage UEs based on one or more metrics. Additionally, the in-coverage UE may determine whether the broadcast message is to be included in a groupcast, broadcast, or unicast signaling. Based on the determination to relay broadcast messages, as well as whether the alert message is to be included in a groupcast, broadcast, or unicast signaling, the in-coverage UE may leverage sidelink communications to relay broadcast messages to the out-of-coverage UEs.

27 Claims, 10 Drawing Sheets

RELAYING BROADCAST MESSAGES TO OUT-OF-COVERAGE USER EQUIPMENT

FIELD OF TECHNOLOGY

The following relates to wireless communications, including relaying broadcast messages to out-of-coverage user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In wireless communications systems, one or more UE may be out of a coverage area corresponding to a base station. In some cases, while outside of the coverage area, the UEs may not be able to detect messages broadcasted by the base station.

SUMMARY

The described techniques relate to improved methods, systems, devices, and apparatuses that support relaying broadcast messages (e.g., alert messages) to user equipment (UE) that are out-of-coverage of a network entity (e.g., either geographically out-of-coverage or otherwise). Generally, the described techniques provide for an in-coverage UE to relay broadcast messages to out-of-coverage UEs using one or more messaging techniques over a sidelink channel (e.g., medium access control-control element (MAC-CE), PC5 radio resource control (RRC) message, or the like). The in-coverage UE may monitor for broadcast messages to relay to out-of-coverage UEs. In some cases, the in-coverage UE may determine to relay broadcast messages to the out-of-coverage UEs based on one or more metrics (e.g., location, power parameters). Additionally, the in-coverage UE may determine whether the broadcast message is to be included in a groupcast, broadcast, or unicast message. Based on the determination to relay broadcast messages, as well as whether the broadcast message is to be included in a groupcast, broadcast, or unicast signaling, the in-coverage UE may leverage sidelink communications to relay the broadcast messages to the out-of-coverage UEs.

A method is described. The method may include receiving a broadcast message from a network entity and relaying, according to a configuration for relaying broadcast messages from the network entity to at least a second user equipment (UE) that is determined to be out of coverage of the network entity, the received broadcast message over a sidelink channel to at least the second UE.

An apparatus is described. The apparatus may include a processor, memory coupled with the processor, and instructions stored in the memory. The instructions may be executable by the processor to cause the apparatus to receive a broadcast message from a network entity and relay, according to a configuration for relaying broadcast messages from the network entity to at least a second UE that is determined to be out of coverage of the network entity, the received broadcast message over a sidelink channel to at least the second UE.

Another apparatus is described. The apparatus may include means for receiving a broadcast message from a network entity and means for relaying, according to a configuration for relaying broadcast messages from the network entity to at least a second UE that is determined to be out of coverage of the network entity, the received broadcast message over a sidelink channel to at least the second UE.

A non-transitory computer-readable medium storing code is described. The code may include instructions executable by a processor to receive a broadcast message from a network entity and relay, according to a configuration for relaying broadcast messages from the network entity to at least a second UE that is determined to be out of coverage of the network entity, the received broadcast message over a sidelink channel to at least the second UE.

In some examples of the method, apparatuses, and non-transitory computer-readable medium described herein, relaying the broadcast message may include operations, features, means, or instructions for transmitting, to at least the second UE, signaling including a groupcast message, a broadcast message, or both.

In some examples of the method, apparatuses, and non-transitory computer-readable medium described herein, the signaling includes a medium access control-control element (MAC-CE) and the sidelink channel includes a physical sidelink shared channel (PSSCH).

In some examples of the method, apparatuses, and non-transitory computer-readable medium described herein, the media access control (MAC)-CE may be multiplexed with other signaling over the primary synchronization signal (PSS)CH based on a configurable priority threshold.

In some examples of the method, apparatuses, and non-transitory computer-readable medium described herein, the signaling includes a physical sidelink control channel (PSCCH) carrying sidelink control information (SCI) and a PSSCH message.

In some examples of the method, apparatuses, and non-transitory computer-readable medium described herein, the SCI indicates that the PSSCH message includes a relayed broadcast message.

In some examples of the method, apparatuses, and non-transitory computer-readable medium described herein, relaying the broadcast message may include operations, features, means, or instructions for transmitting, to at least the second UE, signaling including a unicast message.

In some examples of the method, apparatuses, and non-transitory computer-readable medium described herein, the signaling includes a PC5 radio resource control (RRC) message over the sidelink channel and the sidelink channel includes a physical sidelink control channel (PSCCH) and a physical sidelink shared channel (PSSCH).

In some examples of the method, apparatuses, and non-transitory computer-readable medium described herein, the broadcast message includes an alert message.

In some examples of the method, apparatuses, and non-transitory computer-readable medium described herein, the broadcast message may be indicated in a system information block (SIB) or a master information block (MIB).

In some examples of the method, apparatuses, and non-transitory computer-readable medium described herein, the configuration for relaying broadcast messages from the network entity to at least the second UE may be statically configured or semi-statically configured via RRC signaling.

Some examples of the method, apparatuses, and non-transitory computer-readable medium described herein may further include operations, features, means, or instructions for receiving downlink control information (DCI) over a physical downlink control channel (PDCCH) that dynamically enables or disables for a duration relaying of broadcast messages from the network entity to at least the second UE.

Some examples of the method, apparatuses, and non-transitory computer-readable medium described herein may further include operations, features, means, or instructions for receiving control signaling indicating the configuration.

In some examples of the method, apparatuses, and non-transitory computer-readable medium described herein, the configuration may be preconfigured at the UE.

Some examples of the method, apparatuses, and non-transitory computer-readable medium described herein may further include operations, features, means, or instructions for receiving second control signaling indicating a modification to the configuration for relaying broadcast messages.

In some examples of the method, apparatuses, and non-transitory computer-readable medium described herein, the second control signaling includes a second medium access control-control element (MAC-CE) over a physical sidelink shared channel (PSSCH).

In some examples of the method, apparatuses, and non-transitory computer-readable medium described herein, the second control signaling includes a second PC5 RRC message over a physical sidelink control channel (PSCCH) or a physical sidelink shared channel (PSSCH).

Some examples of the method, apparatuses, and non-transitory computer-readable medium described herein may further include operations, features, means, or instructions for receiving the configuration message may be based on a first parameter indicating a location associated with the UE, a power parameter associated with the UE, or both.

A method for wireless communications at a second UE is described. The method may include identifying a configuration for receiving relayed broadcast messages from a first UE, where the broadcast messages are relayed from the first UE to the second UE, where the first UE is in coverage of a network entity and where the second UE is determined to be out of coverage of the network entity and receiving a relay message over a sidelink channel from the first UE according to the configuration.

An apparatus for wireless communications at a second UE is described. The apparatus may include a processor, memory coupled with the processor, and instructions stored in the memory. The instructions may be executable by the processor to cause the apparatus to identify a configuration for receiving relayed broadcast messages from a first UE, where the broadcast messages are relayed from the first UE to the second UE, where the first UE is in coverage of a network entity and where the second UE is determined to be out of coverage of the network entity and receive a relay message over a sidelink channel from the first UE according to the configuration.

Another apparatus for wireless communications at a second UE is described. The apparatus may include means for identifying a configuration for receiving relayed broadcast messages from a first UE, where the broadcast messages are relayed from the first UE to the second UE, where the first UE is in coverage of a network entity and where the second UE is determined to be out of coverage of the network entity and means for receiving a relay message over a sidelink channel from the first UE according to the configuration.

A non-transitory computer-readable medium storing code for wireless communications at a second UE is described. The code may include instructions executable by a processor to identify a configuration for receiving relayed broadcast messages from a first UE, where the broadcast messages are relayed from the first UE to the second UE, where the first UE is in coverage of a network entity and where the second UE is determined to be out of coverage of the network entity and receive a relay message over a sidelink channel from the first UE according to the configuration.

In some examples of the method, apparatuses, and non-transitory computer-readable medium described herein, receiving the broadcast message may include operations, features, means, or instructions for receiving, from the first UE, signaling including a groupcast message, a broadcast message, or both.

In some examples of the method, apparatuses, and non-transitory computer-readable medium described herein, the signaling includes a medium access control-control element (MAC-CE) and the sidelink channel includes a physical sidelink shared channel (PSSCH).

In some examples of the method, apparatuses, and non-transitory computer-readable medium described herein, the MAC-CE may be multiplexed with other signaling over the sidelink channel based on a configurable priority threshold, the sidelink channel corresponding to a physical sidelink shared channel (PSSCH).

In some examples of the method, apparatuses, and non-transitory computer-readable medium described herein, receiving the broadcast message may include operations, features, means, or instructions for receiving, from the first UE, signaling including a unicast message.

In some examples of the method, apparatuses, and non-transitory computer-readable medium described herein, the signaling includes a PC5 RRC message over the sidelink channel and the sidelink channel includes a physical sidelink control channel (PSCCH) and a physical sidelink shared channel (PSSCH).

In some examples of the method, apparatuses, and non-transitory computer-readable medium described herein, the broadcast message includes an alert message.

In some examples of the method, apparatuses, and non-transitory computer-readable medium described herein, the broadcast message may be indicated in an SIB or a master information block (MIB).

DETAILED DESCRIPTION

Figure 1:
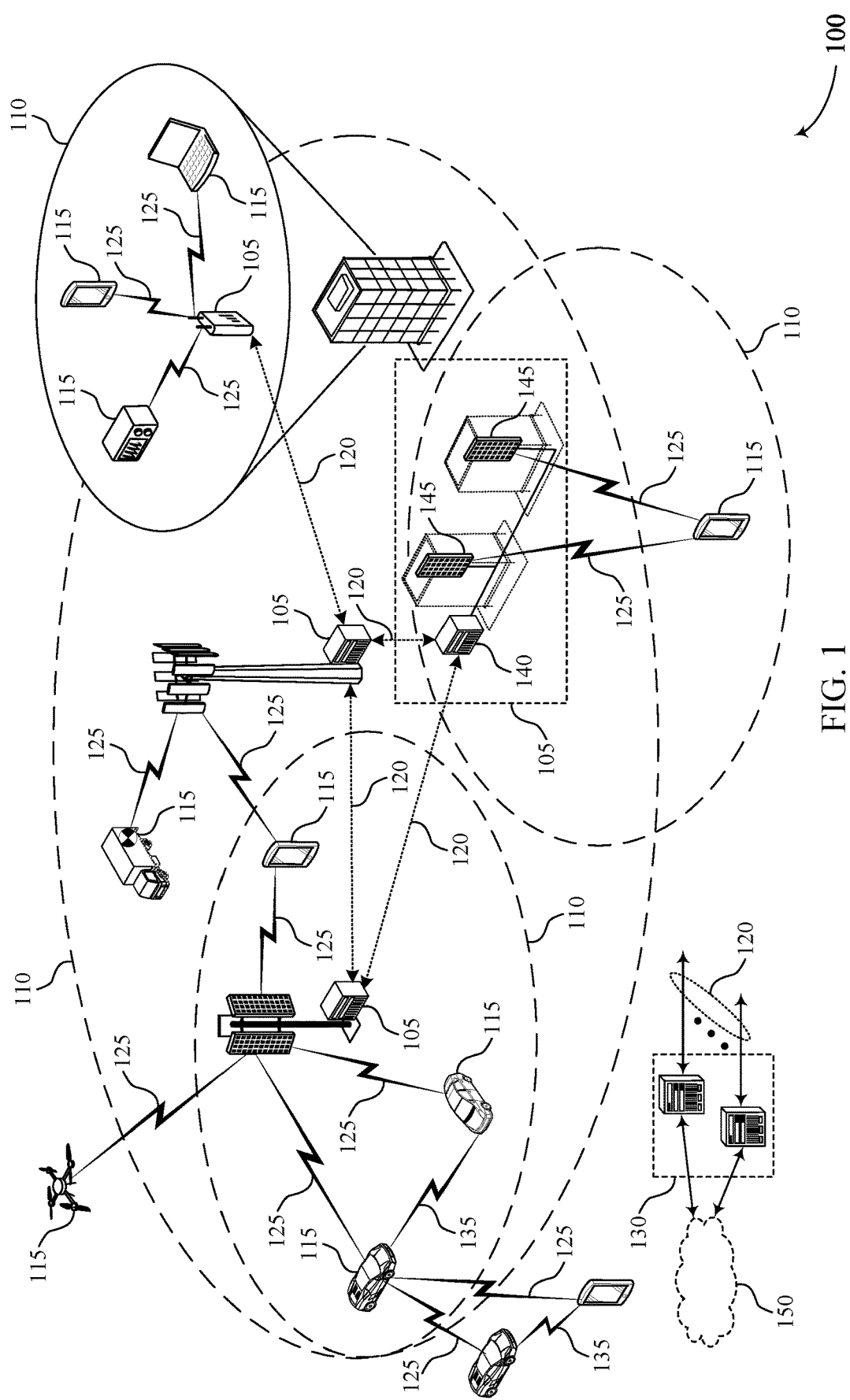
FIG. 1 illustrates an example of a wireless communications system that supports relaying broadcast messages to out-of-coverage user equipment in accordance with aspects of the present disclosure.

In wireless communications systems, one or more user equipments (UEs) may communicate with a base station in support of one or more communications operations, such as uplink and downlink communications. For example, a UE may be within a geographic coverage area corresponding to a base station or other network entity. Some wireless communications systems may also support sidelink communications between UEs. For example, a first UE may be allocated sidelink resources from the base station (e.g., mode 1 sidelink communications) such that the first UE may perform communications operations directly with other UEs. In other examples, the first UE may perform sidelink communications autonomously (e.g., mode 2 sidelink). In such cases, the first UE may perform one or more procedures to communicate directly with other UEs via sidelink resources.

In some cases, however, UEs operating autonomously using sidelink resources may be outside of a geographic coverage area corresponding to a base station or may otherwise be out-of-coverage of the base station (e.g., not configured to communicate with the base station). In such cases, while the UEs may be capable of performing sidelink communications autonomously, the UEs may not receive messages directly from the base station. For example, the base station may transmit a broadcast message such as an alert (e.g., an alert corresponding to an earthquake and tsunami warning system (ETWS), a commercial mobile alert system (CMAS), and the like) to in-coverage UEs. Since some UEs may be performing autonomous sidelink communications outside of the geographic coverage area, the UEs outside of the geographic coverage area may not receive the alert message, which may pose additional risk to users and hinder coordinated efforts to prepare for an event corresponding to the alert message.

In some cases, such as those described in the present disclosure, an in-coverage UE (e.g., a UE that is within a geographic coverage of a base station or otherwise configured to communicate with the base station) may relay broadcast messages (e.g., an alert message or any other type of broadcast message) to out-of-coverage UEs. In some cases, the in-coverage UE may receive a configuration from a base station to forward the alert message to out-of-coverage UEs. For example, an in-coverage UE may receive a configuration to monitor one or more occasions (e.g., paging occasions) for an indication of an alert message. The in-coverage UE may obtain the alert message by decoding one or more system information messages such as system information blocks (SIB), which the in-coverage UE may utilize to forward the alert message on to subsequent UEs (e.g., out-of-coverage UEs). In some examples, the in-coverage UE may utilize one or more forwarding mediums to relay the alert message to out-of-coverage UEs. For example, the in-coverage UE may utilize medium access control-control element (MAC-CE) over a physical sidelink shared channel (PSSCH) to relay an alert message to out-of-coverage UEs. As another example, the in-coverage UE may utilize a unicast transmission (e.g., over PC5 radio resource control (PC5-RRC) signaling) using a sidelink control channel type message to relay the alert message to out-of-coverage UEs. By leveraging sidelink channels, out-of-coverage UEs performing sidelink communications autonomously may receive alert messages from base stations via relays from in-coverage UEs Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to relaying broadcast messages to out-of-coverage user equipment.

FIG. 1 illustrates an example of a wireless communications system 100 that supports relaying alert messages to out-of-coverage autonomous device in fifth generation (5G) New Radio (NR) sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Aspects of the present disclosure relate to an in-coverage UE 115 relaying broadcast messages (e.g., alert messages) to out-of-coverage UEs 115 using one or more messaging techniques over a sidelink channel (e.g., MAC-CE over PSSCH, PC5-RRC signaling over PSCCH). The in-coverage UE 115 may monitor for alert messages from the base station 105 to relay to out-of-coverage UEs 115. In some cases, the base station 105 or an in-coverage UE 115 may determine to relay alert messages to the out-of-coverage UEs 115 based on one or more metrics associated with the in-coverage UE 115 (e.g., location, power parameters). Additionally, the in-coverage UE 115 may determine whether the alert message is to be included in a groupcast, broadcast, or unicast message. Based on the determination to relay alert messages, as well as whether the alert message is to be included in a groupcast, broadcast, or unicast signaling, the in-coverage UE 115 may leverage sidelink communications to relay the alert messages to the out-of-coverage UEs 115.

Figure 2:
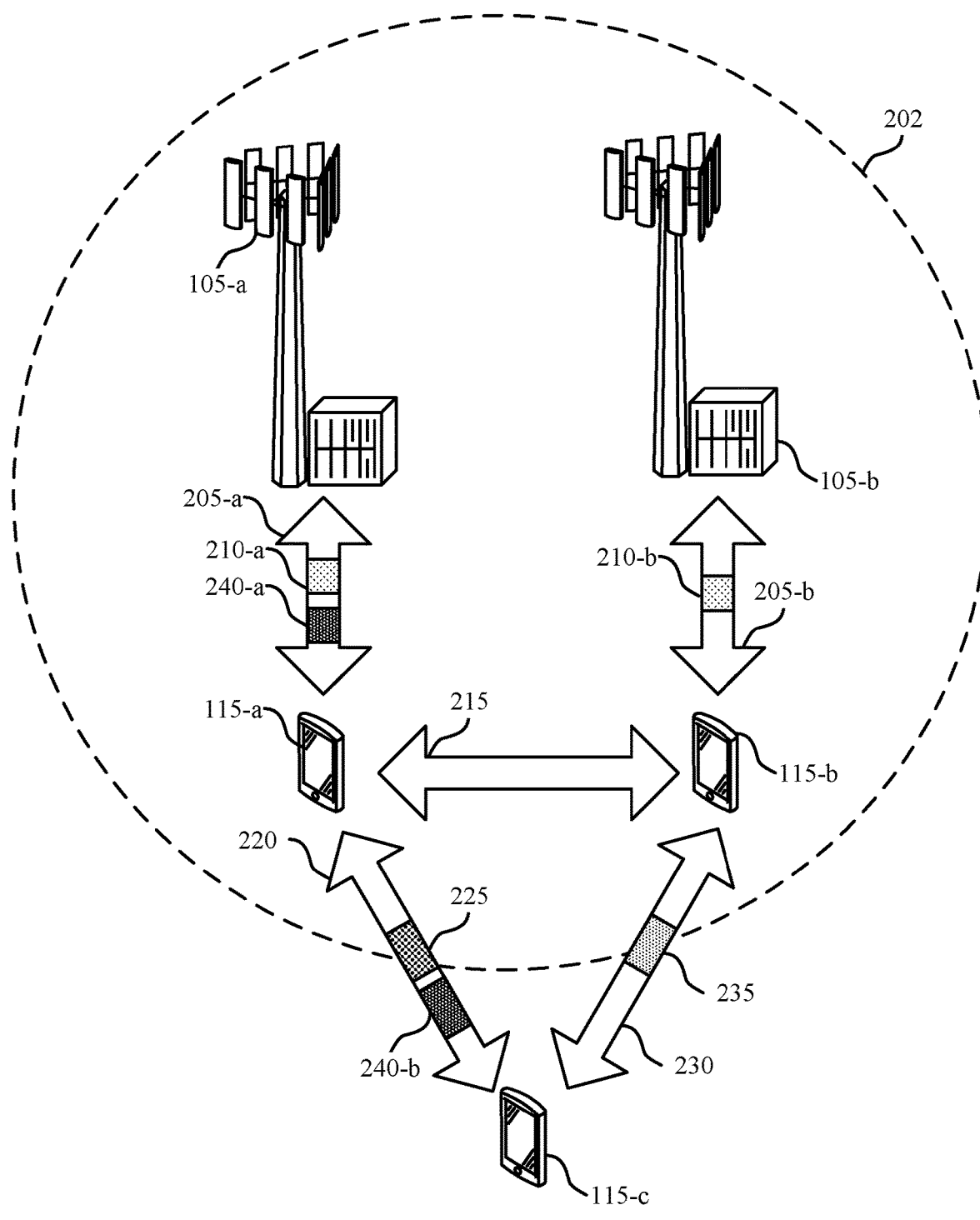
FIG. 2 illustrates an example of a wireless communications system that supports relaying broadcast messages to out-of-coverage user equipment in accordance with aspects of the present disclosure.

FIG. 2 illustrates an example of a wireless communications system 200 that supports relaying broadcast messages to out-of-coverage user equipment in accordance with aspects of the present disclosure. The wireless communications system 200 may include a base station 105-a, a base station 105-b, a UE 115-a, a UE 115-b, and a UE 115-c, which may be examples of a base station 105 and a UE 115 as described with reference to FIG. 1. In some cases, such as illustrated in FIG. 2, the UEs 115-a and 115-b may be within the geographic region 202, while the UE 115-c may be outside the geographic region 202 corresponding to coverage areas associated with the base stations 105-a and 105-b. While operations and techniques may be discussed below as being performed by particular wireless devices, it is important to note that the operations and techniques may be performed by any number of wireless devices in any order. Accordingly, any of the UEs 115-a, 115-b, and 115-c, may act as a relay or an out-of-coverage UE based on whether the UEs 115-a, 115-b, and 115-c are within the geographic region 202.

The UE 115-a may perform communications (e.g., using a Uu interface) with the base station 105-a over a communication link 205-a. Similarly, the UE 115-b may perform communications with the base station 105-b over a communication link 205-b. Additionally, in some examples (e.g., V2X systems), the UEs 115-a, 115-b, and 115-c may perform sidelink communications over sidelink resources. For example, the UEs 115-a, 115-b, and 115-c may perform autonomous sidelink communications (e.g., mode 2) in support of V2X operations. The UEs 115-a and 115-b may utilize a sidelink channel 215 to exchange information, such as control signaling or data messages (e.g., public safety messages or the like). The UE 115-a may utilize a sidelink channel 220 to communicate with the UE 115-c, such as transmitting a sidelink message 225. Similarly, the UE 115-b may utilize a sidelink channel 230 to communicate with the UE 115-c, such as transmitting a sidelink message 235.

As discussed briefly above, the UEs 115-a and 115-b may be within the geographic region 202 corresponding to a coverage region associated with the base stations 105-a and 105-b, while the UE 115-c may be outside the geographic region 202. In such examples, the UEs 115-a and 115-b may be considered in a geographic coverage area or in-coverage of base stations 105-a or 105-b. Similarly, UE 115-c may be considered to be out-of-coverage of base stations 105-a and 105-b, because the UEs 115-a and 115-b are outside of the geographic coverage area 202 or because the UEs 115-a and 115-b are otherwise not configured to communicate with base stations 105-a and 105-b. The UE 115-c may be configured to perform sidelink communications (e.g., with the UEs 115-a and 115-b), but may not be configured to receive messages (e.g., broadcast messages such as alert messages) directly from the base stations 105-a and 105-b. For example, in cases where a message from one of the base stations 105-a and 105-b is a broadcasted alert message (e.g., ETWS, CMAS), the UEs 115-a and 115-b may receive the broadcasted alert message, but the UE 115-c may not receive the alert message. Not receiving the alert message, which may correspond to an ETWS, may pose a risk to a user corresponding to the UE 115-c.

In some cases, however, one of the UEs 115-*a* and 115-*b* may be configured to relay alert messages or other broadcast messages to out-of-coverage UEs. Particularly, the UEs 115-*a* and 115-*b* may receive configurations to relay alert messages to out-of-coverage UEs from the base stations 105-*a* and 105-*b*. In some examples, one of the UEs 115-*a* and 115-*b* may be configured to relay alert messages to out-of-coverage UEs, while the remaining UE may not perform relaying to out-of-coverage UEs (e.g., to control flooding alert messages throughout the network, which may congest network resources). For example, The UE 115-*b* may receive a configuration message 210-*b* over the communication link 205-*b*, where the configuration message 210-*b* does not configure the UE 115-*b* to relay alert messages to out-of-coverage UEs (e.g., the UE 115-*c*). Conversely, the UE 115-*a* may receive control signaling (e.g., a configuration message 210-*a*) over the communication link 205-*a*, where the configuration message 210-*a* configures the UE 115-*a* to relay alert messages or other broadcast signaling from the base station 105-*a* to the UE 115-*c* or other UEs that are determined to be out-of-coverage of the base station 105-*a*.

In some examples, the configuration messages 210-*a* and 210-*b* may correspond to a semi-statically configured or statically configured configurations that are sent via control signaling such as RRC signaling. In other examples, the UE 115-*a* may receive an indication of a duration of relaying for performing alert message relaying to out-of-coverage UEs (e.g., over downlink control information (DCI) over a physical downlink control channel (PDCCH)), where the DCI may dynamically enable or disable a duration of relaying broadcast messages from the base station 105-*a*. For example, the UE 115-*a* may receive the configuration message 210-*a*, where the configuration message 210-*a* corresponds to an RRC message instructing the UE 115-*a* to monitor for broadcast alert messages and to forward the broadcast alert messages to out-of-coverage UEs (e.g., using DCI format 3_0) for a specified time duration. In some examples, the UE 115-*a* may receive the configuration message 210-*a* based on a parameter, where the parameter may indicate a location associated with the UE 115-*a*, a power parameter associated with the UE 115-*a*, or both. For example, the base station 105-*a* may select UE 115-*a* for broadcast message relaying if the UE 115-*a* is near the edge of the geographic coverage area 202 and therefore in an advantageous location to relay broadcast messages farther away from the base station 105-*a*. Additionally or alternatively, the base station 105-*a* may select the UE 115-*a* for broadcast message relaying if the battery power of the UE 115-*a* is above a threshold, and may similarly not select the UE 115-*a* is the battery power is below a threshold due to the increased power consumption associated with broadcast message relaying. In some cases, a Mode 1 DCI may indicate that a grant associated with the configuration message 210-*a* is a grant to forward broadcasted alert messages. In other cases, the UE 115-*a* may be preconfigured to perform relaying of alert messages to out-of-coverage UEs. In such cases, the UE 115-*a* may not need explicit configuration signaling to perform the relaying or may need fewer configuration parameters than if being fully configured with control signaling.

In such cases, the UE 115-*a* may monitor one or more occasions (e.g., DCI_1_0 masked by paging-radio network temporary identifier (P-RNTI)). When the UE 115-*a* detects an alert message 240-*a*, the UE 115-*a* may obtain the alert message 240-*a* by decoding one or more system information blocks (SIBs) (e.g., based on the alert message 240-*a* being broadcasted in SIBs 6, 7, and 8). In some examples, the UE 115-*a* may detect the alert message 240-*a* within a master information block (MIB) or other system information signaling. The UE 115-*a* may receive the alert message 240-*a* and begin forwarding the alert message to out-of-coverage UEs (e.g., the UE 115-*c*) in accordance with the configuration message 210-*a*. For example, the UE 115-*a* may utilize one or more forwarding mediums to relay the alert message 240-*a* to the UE 115-*c*. The UE 115-*a* may utilize groupcasting, broadcasting, or both to relay the alert message 240-*a*. That is, the UE 115-*a* may utilize PSSCH to transmit a MAC-CE indicating the alert message 240-*a* to the UE 115-*c*.

The MAC-CE may be included if the UE 115-*a* already has a transmission awaiting to be sent (e.g., the sidelink message 225). In some cases, the UE 115-*a* may transmit the MAC-CE based on a configurable priority threshold (e.g., multiplex the MAC-CE with a message if the message corresponds to a low priority transmissions or create a new transmission). In other examples, however, the UE 115-*a* may relay the alert message 240-*a* via unicast over a PC5-RRC message (e.g., utilizing a sidelink control channel message type over the sidelink channel 220). In such cases, the UE 115-*a* may transmit the PC5-RRC message over a physical sidelink control channel (PSCCH), PSSCH, or both. Based on the forwarding medium, the UE 115-*a* may relay an alert message 240-*b* (e.g., corresponding to the alert message 240-*a*) over the sidelink channel 220. In some cases, the alert message 240-*b* may correspond to a PSSCH message including sidelink control information (SCI), where the SCI may indicate the PSSCH message corresponds to a relayed broadcast alert message.

In some examples, the UE 115-*a* may receive a second control signal indicating a modification to the configuration for relaying broadcast messages (e.g., where the configuration corresponds to the configuration 210-*a*). In some cases, the second control signal may correspond to a second MAC-CE message over a PSSCH. For example, the UE 115-*c* may determine that the UE 115-*c* has moved to a new physical location such that the UE 115-*c* now resides within the geographic region 202. Accordingly, the UE 115-*c* may determine that broadcast messages (e.g., alert messages) from the base station 105-*a* may now be received at the UE 115-*c*. As such, the UE 115-*c* may notify the UE 115-*a* that the UE 115-*a* may cease alert message relaying.

Figure 3:
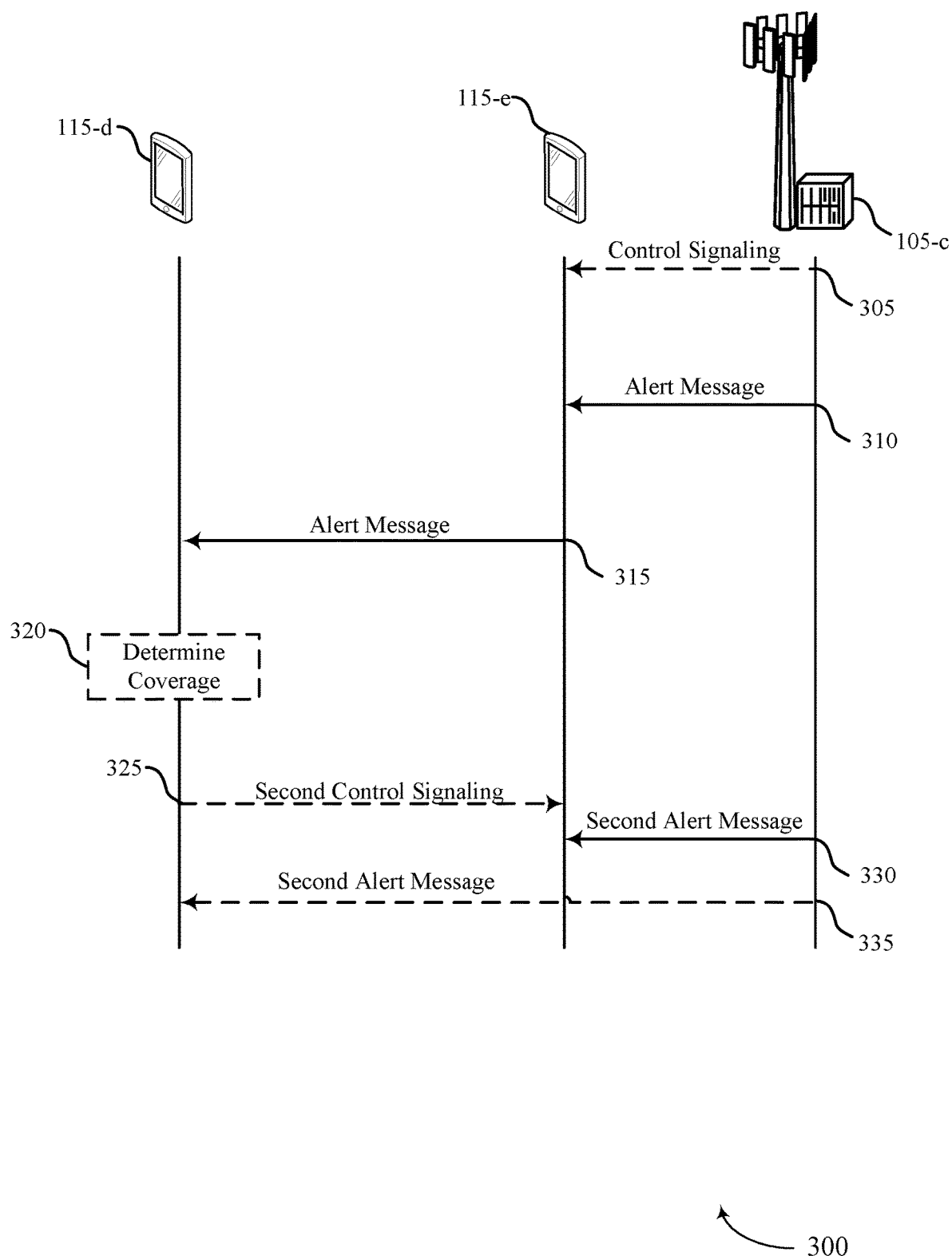
FIG. 3 illustrates an example of a process flow that supports relaying broadcast messages to out-of-coverage user equipment in accordance with aspects of the present disclosure.

FIG. 3 illustrates an example of a process flow 300 that supports relaying broadcast messages to out-of-coverage user equipment in accordance with aspects of the present disclosure. The process flow 300 may be performed by one or more wireless devices, such as a base station 105-*c*, a UE 115-*d*, and a UE 115-*e*, which may be examples of a base station 105 and a UE 115 as described with reference to FIG. 1. In some examples, the process flow 300 may include one or more operations, signals, and procedures associated with the base station 105-*c* and the UEs 115-*d* and 115-*e*, which may be examples of those discussed with reference to FIG. 2. The UE 115-*e* may be within a geographic coverage area associated with the base station 105-*c*, while the UE 115-*d* may be outside the geographic coverage area. Additionally, the UEs 115-*e* and 115-*d* may perform sidelink communications (e.g., autonomously) to exchange information. While specific operations and techniques are discussed below, the operations and techniques may be performed in a different order than the example order shown, or the operations performed by the devices may be performed by different devices or at different times. Additionally, steps may be added or removed from the process flow 300.

Optionally, at 305, the UE 115-*e* may receive control signaling indicating a configuration for broadcast message relaying (e.g., alert message relaying) to out-of-coverage UEs (e.g., the UE 115-*d*). In some examples, the configuration for alert message relaying may correspond to a semi-statically configured or statically configured relaying configuration indicated via RRC signaling. In other examples, the configuration may indicate a duration of relaying for performing alert message relaying to out-of-coverage UEs (e.g., over DCI over a PDCCH) where the DCI may dynamically enable or disable a duration of relaying broadcast messages from the base station 105-*c*. For example, the UE 115-*e* may receive the configuration message, where the configuration message corresponds to an RRC message instructing the UE 115-*e* to monitor for broadcast alert messages and to forward the broadcast alert messages to out-of-coverage UEs (e.g., using DCI format 3_0) for a specified time duration. In some examples, the UE 115-*e* may receive the configuration message based on a parameter, where the parameter may indicate a location associated with the UE 115-*e*, a power parameter associated with the UE 115-*e*, or both. For example, the base station 105-*c* may select the UE 115-*e* as candidate for relaying broadcast messages based on the location or power parameters and may transmit the configuration message to the UE 105-*c* based on the selecting. In some cases, a Mode 1 DCI may indicate that a grant associated with the configuration message is a grant to forward broadcasted alert messages. In other cases, the UE 115-*e* may be preconfigured to perform relaying of alert messages to out-of-coverage UEs.

At 310, the base station 105-*c* may broadcast an alert message to in-coverage UEs (e.g., the UE 115-*e*). At 315, the UE 115-*e* may forward the alert message to the out-of-coverage UE (e.g., the UE 115-*d*) over a sidelink channel, which may optionally be based on the configuration message received at 305. In some cases, the forwarded alert message may correspond to a broadcast, groupcast, or both, over sidelink. In other examples, the forwarded alert message may correspond to a unicast (e.g., PC5-RRC).

Optionally, at 320, the UE 115-*d* may determine coverage associated with the UE 115-*d* (e.g., that the UE 115-*d* may reside within the geographic coverage region associated with the base station 105-*c*). Optionally, at 325, the UE 115-*d* may transit a second control signaling to the UE 115-*e*, where the second control signaling may instruct the UE 115-*e* to cease alert message relaying to the UE 115-*d*.

At 330, the base station 105-*c* may transmit a second alert message, where in-coverage UEs (e.g., UE 115-*e*) may receive the second alert message. Based on determining coverage at 320 and the second control signaling at 325, the UE 115-*e* may not relay the second alert message to the UE 115-*d*. Instead, the UE 115-*d* may now reside within the geographic coverage area associated with the base station 105-*c*. As such, optionally, at 335, the UE 115-*d* may also receive the second alert message from the base station 105-*c* (e.g., the UE 115-*d* may also receive the broadcasted alert message since the UE 115-*d* now resides within the geographic coverage area or is otherwise determined to be in-coverage of the base station 105-*c*).

Figure 4:
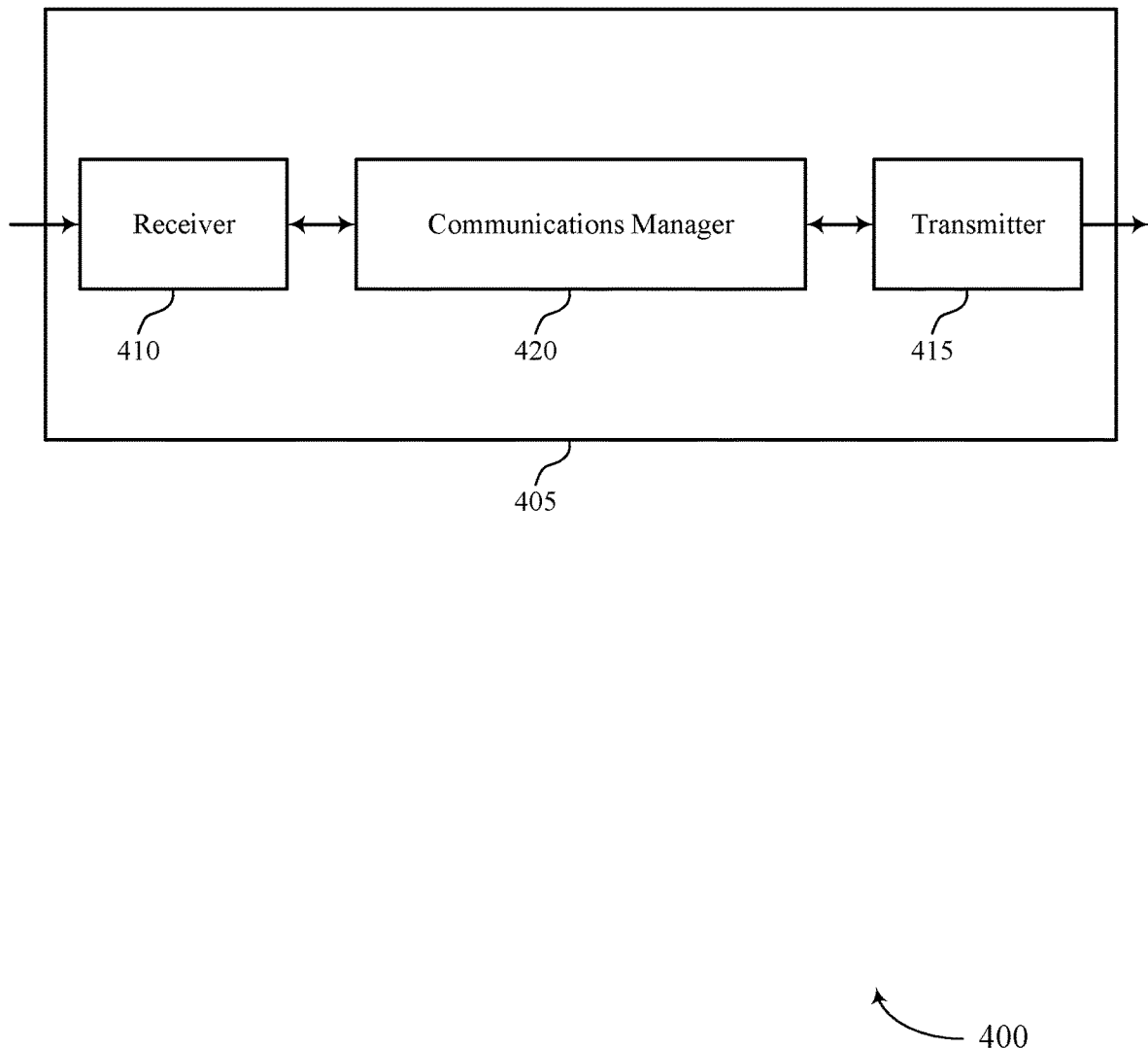
FIGS. 4 and 5 show block diagrams of devices that support relaying broadcast messages to out-of-coverage user equipment in accordance with aspects of the present disclosure.

FIG. 4 shows a block diagram 400 of a device 405 that supports relaying broadcast messages to out-of-coverage user equipment in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to relaying broadcast messages to out-of-coverage user equipment). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to relaying broadcast messages to out-of-coverage user equipment). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of relaying broadcast messages to out-of-coverage user equipment as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

For example, the communications manager 420 may be configured as or otherwise support a means for receiving a broadcast message from a network entity. The communications manager 420 may be configured as or otherwise support a means for relaying, according to a configuration for relaying broadcast messages from the network entity to at least a second UE that is determined to be out of coverage of the network entity, the received broadcast message over a sidelink channel to at least the second UE.

Additionally or alternatively, the communications manager 420 may support wireless communications at a second UE in accordance with examples as disclosed herein. For example, the communications manager 420 may be configured as or otherwise support a means for identifying a configuration for receiving relayed broadcast messages from a first UE, where the broadcast messages are relayed from the first UE to the second UE, where the first UE is in coverage of a network entity and where the second UE is determined to be out of coverage of the network entity. The communications manager 420 may be configured as or otherwise support a means for receiving a relay message over a sidelink channel from the first UE according to the configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, more efficient utilization of communication resources by leveraging sidelink communications to relay alert messages to out-of-coverage UEs. Specifically, relaying alert messages may simplify otherwise complex tasks at an out-of-coverage UE by avoiding processing associated with establishing a communication link with a base station.

Figure 5:
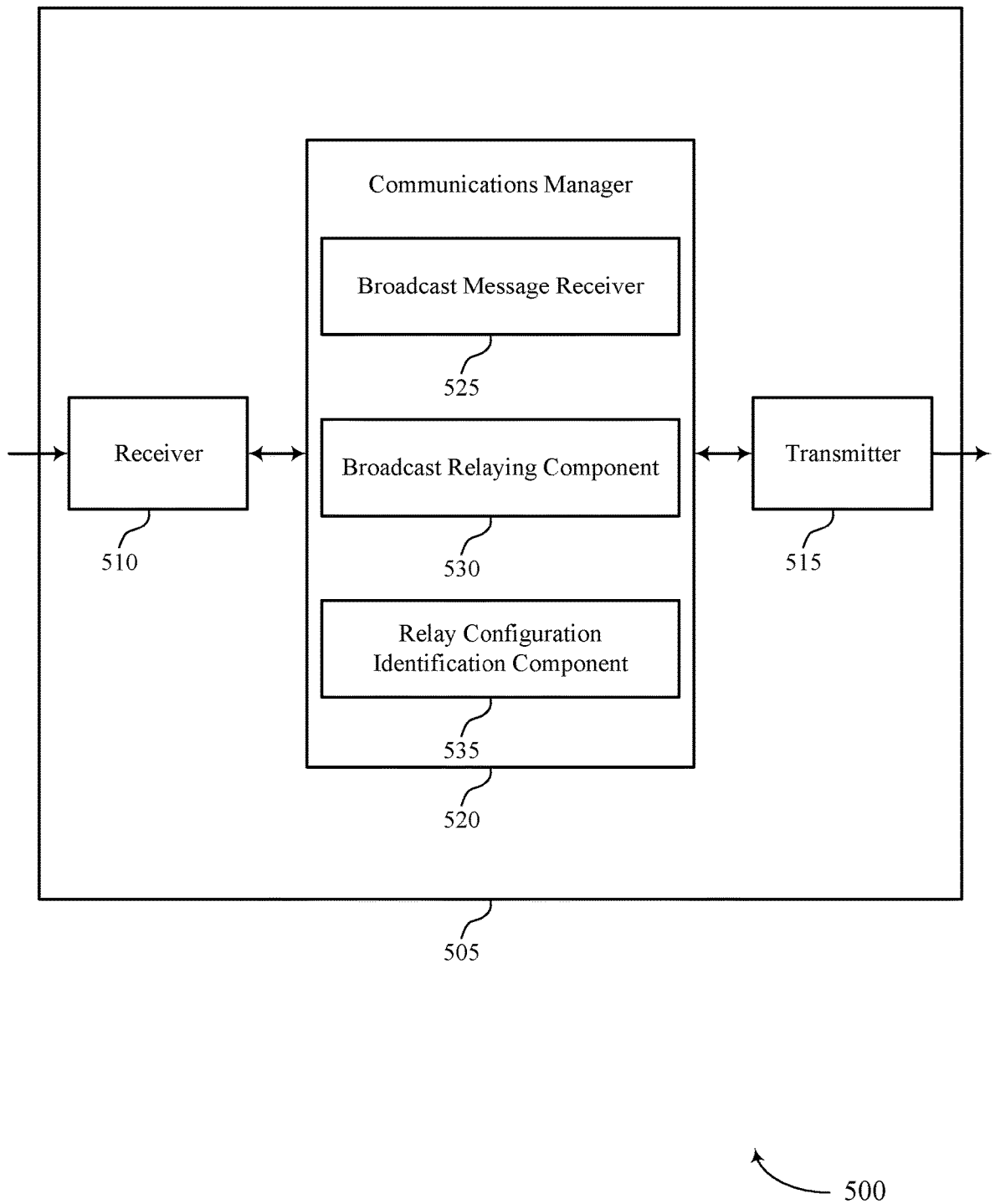

FIG. 5 shows a block diagram 500 of a device 505 that supports relaying broadcast messages to out-of-coverage user equipment in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to relaying broadcast messages to out-of-coverage user equipment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to relaying broadcast messages to out-of-coverage user equipment). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of relaying broadcast messages to out-of-coverage user equipment as described herein. For example, the communications manager 520 may include a broadcast message receiver 525, a broadcast relaying component 530, a relay configuration identification component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The broadcast message receiver 525 may be configured as or otherwise support a means for receiving a broadcast message from a network entity. The broadcast relaying component 530 may be configured as or otherwise support a means for relaying, according to a configuration for relaying broadcast messages from the network entity to at least a second UE that is determined to be out of coverage of the network entity, the received broadcast message over a sidelink channel to at least the second UE.

Additionally or alternatively, the communications manager 520 may support wireless communications at a second UE in accordance with examples as disclosed herein. The relay configuration identification component 535 may be configured as or otherwise support a means for identifying a configuration for receiving relayed broadcast messages from a first UE, where the broadcast messages are relayed from the first UE to the second UE, where the first UE is in coverage of a network entity and where the second UE is determined to be out of coverage of the network entity. The broadcast message receiver 525 may be configured as or otherwise support a means for receiving a relay message over a sidelink channel from the first UE according to the configuration.

Figure 6:
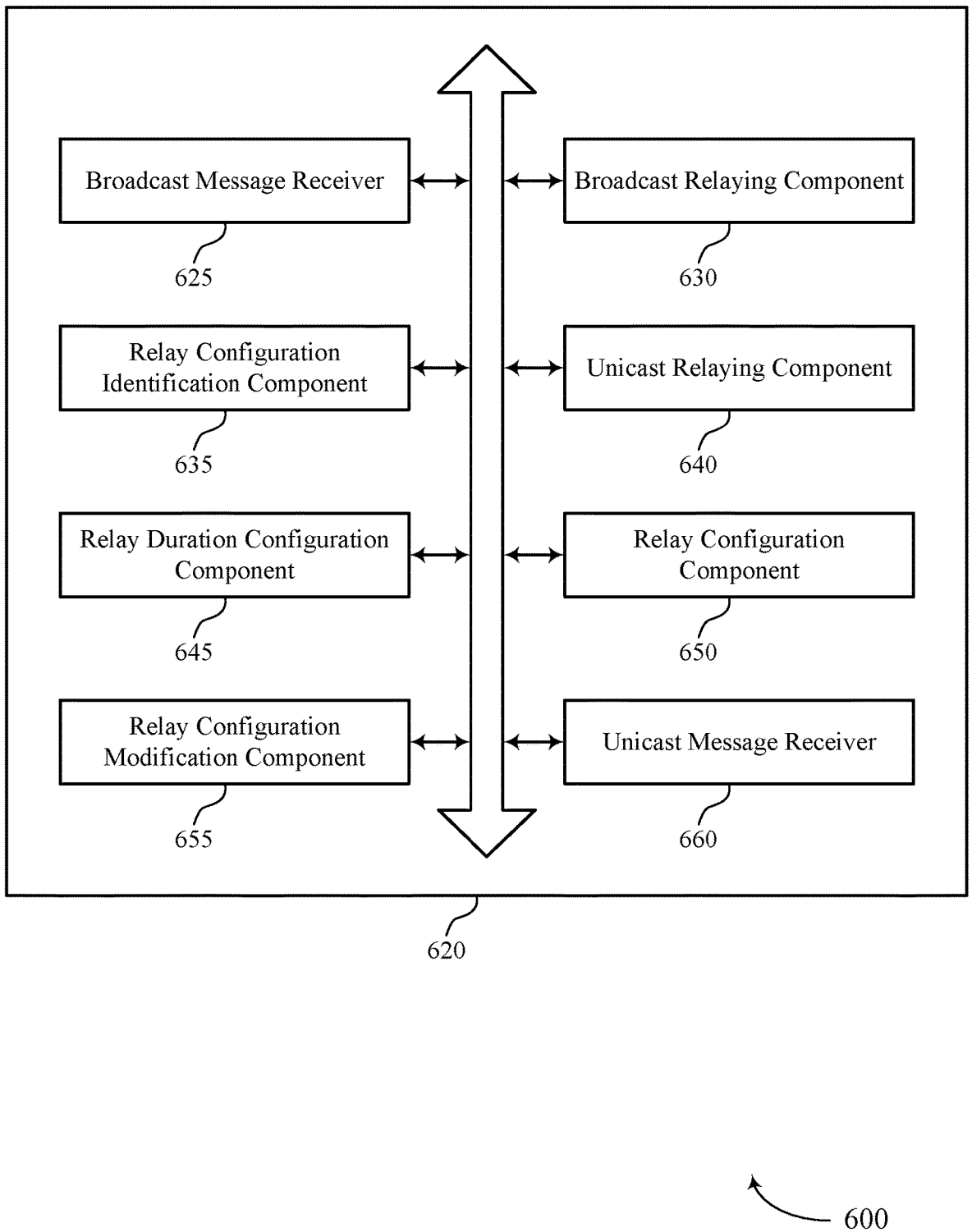
FIG. 6 shows a block diagram of a communications manager that supports relaying broadcast messages to out-of-coverage user equipment in accordance with aspects of the present disclosure.

FIG. 6 shows a block diagram 600 of a communications manager 620 that supports relaying broadcast messages to out-of-coverage user equipment in accordance with aspects of the present disclosure. The communications manager 620 may be an example of aspects of a communications manager 420, a communications manager 520, or both, as described herein. The communications manager 620, or various components thereof, may be an example of means for performing various aspects of relaying broadcast messages to out-of-coverage user equipment as described herein. For example, the communications manager 620 may include a broadcast message receiver 625, a broadcast relaying component 630, a relay configuration identification component 635, a unicast relaying component 640, a relay duration configuration component 645, a relay configuration component 650, a relay configuration modification component 655, a unicast message receiver 660, or any combination thereof. Each of these components may communicate, directly or indirectly, with one another (e.g., via one or more buses).

The broadcast message receiver 625 may be configured as or otherwise support a means for receiving a broadcast message from a network entity. The broadcast relaying component 630 may be configured as or otherwise support a means for relaying, according to a configuration for relaying broadcast messages from the network entity to at least a second UE that is determined to be out of coverage of the network entity, the received broadcast message over a sidelink channel to at least the second UE.

In some examples, to support relaying the broadcast message, the broadcast relaying component 630 may be configured as or otherwise support a means for transmitting, to at least the second UE, signaling including a groupcast message, a broadcast message, or both.

In some examples, the signaling includes a MAC-CE and the sidelink channel includes a PSSCH.

In some examples, the MAC-CE is multiplexed with other signaling over the PSSCH based on a configurable priority threshold.

In some examples, the signaling includes a PSCCH carrying SCI and a PSSCH message.

In some examples, the SCI indicates that the PSSCH message includes a relayed broadcast message.

In some examples, to support relaying the broadcast message, the unicast relaying component 640 may be configured as or otherwise support a means for transmitting, to at least the second UE, signaling including a unicast message.

In some examples, the signaling includes a PC5 RRC message over the sidelink channel and the sidelink channel includes a PSCCH and a PSSCH.

In some examples, the broadcast message includes an alert message.

In some examples, the broadcast message is indicated in an SIB or a MIB.

In some examples, the configuration for relaying broadcast messages from the network entity to at least the second UE is statically configured or semi-statically configured via RRC signaling.

In some examples, the relay duration configuration component 645 may be configured as or otherwise support a means for receiving DCI over a PDCCH that dynamically enables or disables for a duration relaying of broadcast messages from the network entity to at least the second UE.

In some examples, the relay configuration component 650 may be configured as or otherwise support a means for receiving control signaling indicating the configuration.

In some examples, the configuration is preconfigured at the UE.

In some examples, the relay configuration modification component 655 may be configured as or otherwise support a means for receiving second control signaling indicating a modification to the configuration for relaying broadcast messages.

In some examples, the second control signaling includes a second MAC-CE over a physical sidelink shared channel (PSSCH).

In some examples, the second control signaling includes a second PC5 RRC message over a PSCCH or a PSSCH.

In some examples, receiving the configuration message is based on a first parameter indicating a location associated with the UE, a power parameter associated with the UE, or both.

Additionally or alternatively, the communications manager 620 may support wireless communications at a second UE in accordance with examples as disclosed herein. The relay configuration identification component 635 may be configured as or otherwise support a means for identifying a configuration for receiving relayed broadcast messages from a first UE, where the broadcast messages are relayed from the first UE to the second UE, where the first UE is in coverage of a network entity and where the second UE is determined to be out of coverage of the network entity. In some examples, the broadcast message receiver 625 may be configured as or otherwise support a means for receiving a relay message over a sidelink channel from the first UE according to the configuration.

In some examples, to support receiving the broadcast message, the broadcast message receiver 625 may be configured as or otherwise support a means for receiving, from the first UE, signaling including a groupcast message, a broadcast message, or both.

In some examples, the signaling includes a MAC-CE and the sidelink channel includes a PSSCH.

In some examples, the MAC-CE is multiplexed with other signaling over the sidelink channel based on a configurable priority threshold, the sidelink channel corresponding to a PSSCH.

In some examples, to support receiving the broadcast message, the unicast message receiver 660 may be configured as or otherwise support a means for receiving, from the first UE, signaling including a unicast message.

In some examples, the signaling includes a PC5 RRC message over the sidelink channel and the sidelink channel includes a PSCCH and a PSSCH.

In some examples, the broadcast message includes an alert message.

In some examples, the broadcast message is indicated in an SIB or a MIB.

Figure 7:
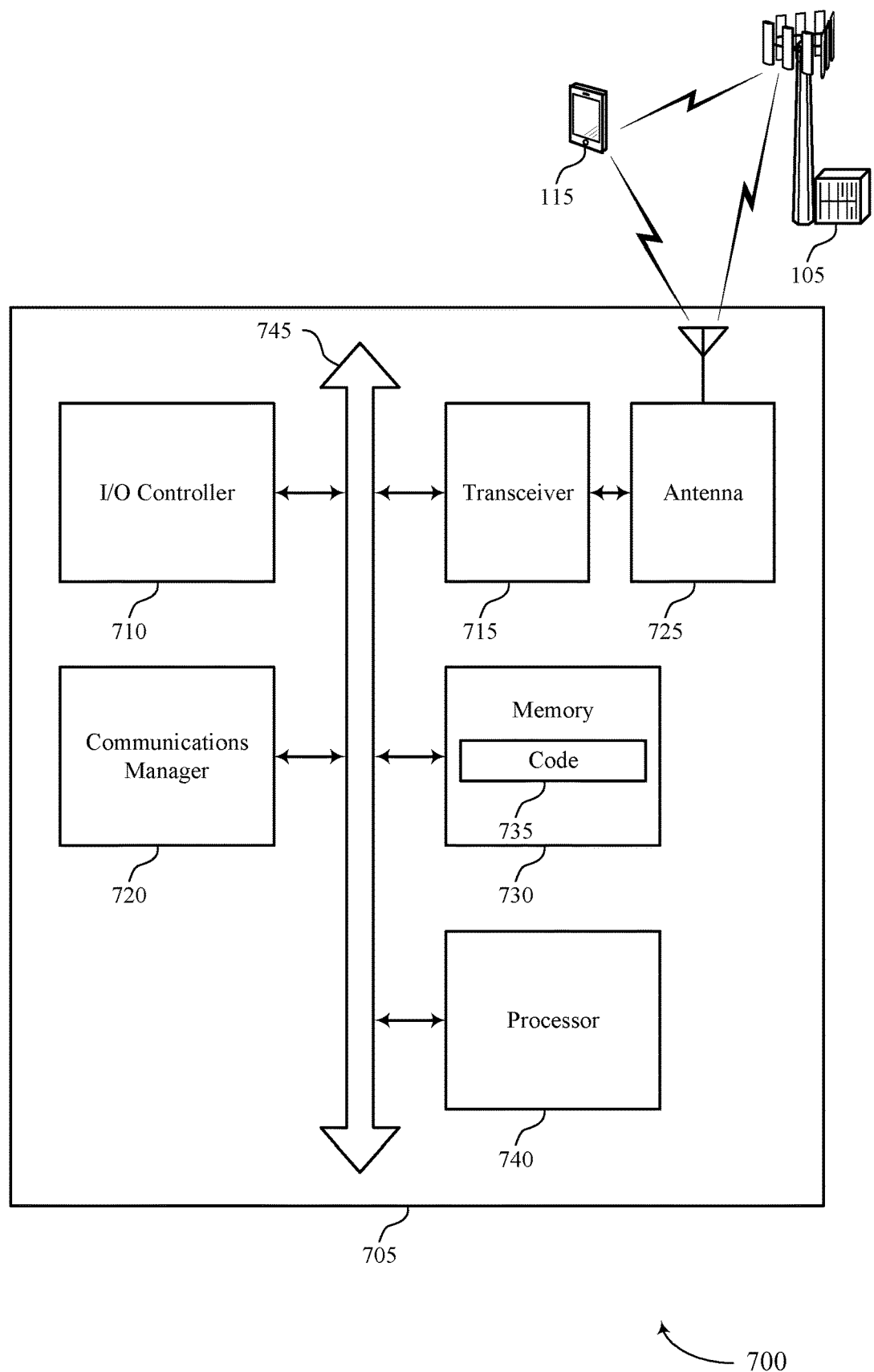
FIG. 7 shows a diagram of a system including a device that supports relaying broadcast messages to out-of-coverage user equipment in accordance with aspects of the present disclosure.

FIG. 7 shows a diagram of a system 700 including a device 705 that supports relaying broadcast messages to out-of-coverage user equipment in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting relaying broadcast messages to out-of-coverage user equipment). For example, the device 705 or a component of the device 705 may include a processor 740 and memory 730 coupled to the processor 740, the processor 740 and memory 730 configured to perform various functions described herein.

For example, the communications manager 720 may be configured as or otherwise support a means for receiving a broadcast message from a network entity. The communications manager 720 may be configured as or otherwise support a means for relaying, according to a configuration for relaying broadcast messages from the network entity to at least a second UE that is determined to be out of coverage of the network entity, the received broadcast message over a sidelink channel to at least the second UE.

Additionally or alternatively, the communications manager 720 may support wireless communications at a second UE in accordance with examples as disclosed herein. For example, the communications manager 720 may be configured as or otherwise support a means for identifying a configuration for receiving relayed broadcast messages from a first UE, where the broadcast messages are relayed from the first UE to the second UE, where the first UE is in coverage of a network entity and where the second UE is determined to be out of coverage of the network entity. The communications manager 720 may be configured as or otherwise support a means for receiving a relay message over a sidelink channel from the first UE according to the configuration.

By including or configuring the communications manager 720 in accordance with examples as described herein, the device 705 may support techniques for improved communication reliability, reduced latency, more efficient utilization of communication resources, improved coordination between devices, and reduced signaling overhead by leveraging sidelink communications to relay alert messages to out-of-coverage UEs.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of relaying broadcast messages to out-of-coverage user equipment as described herein, or the processor 740 and the memory 730 may be otherwise configured to perform or support such operations.

Figure 8:
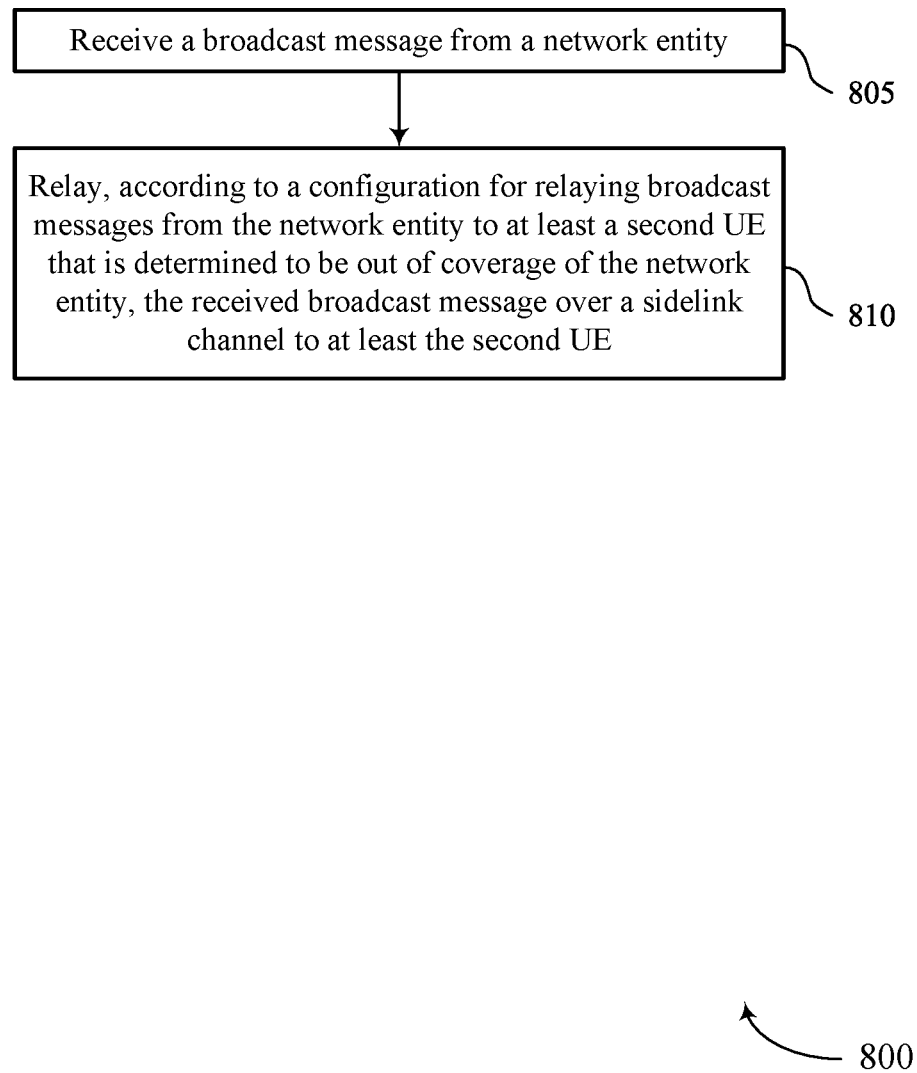
FIGS. 8 through 10 show flowcharts illustrating methods that support relaying broadcast messages to out-of-coverage user equipment in accordance with aspects of the present disclosure.

FIG. 8 shows a flowchart illustrating a method 800 that supports relaying broadcast messages to out-of-coverage user equipment in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving a broadcast message from a network entity. The operations of 805 may be performed in accordance with examples as disclosed herein. In some examples, aspects of the operations of 805 may be performed by a broadcast message receiver 625 as described with reference to FIG. 6.

At 810, the method may include relaying, according to a configuration for relaying broadcast messages from the network entity to at least a second UE that is determined to be out of coverage of the network entity, the received broadcast message over a sidelink channel to at least the second UE. The operations of 810 may be performed in accordance with examples as disclosed herein. In some examples, aspects of the operations of 810 may be performed by a broadcast relaying component 630 as described with reference to FIG. 6.

Figure 9:
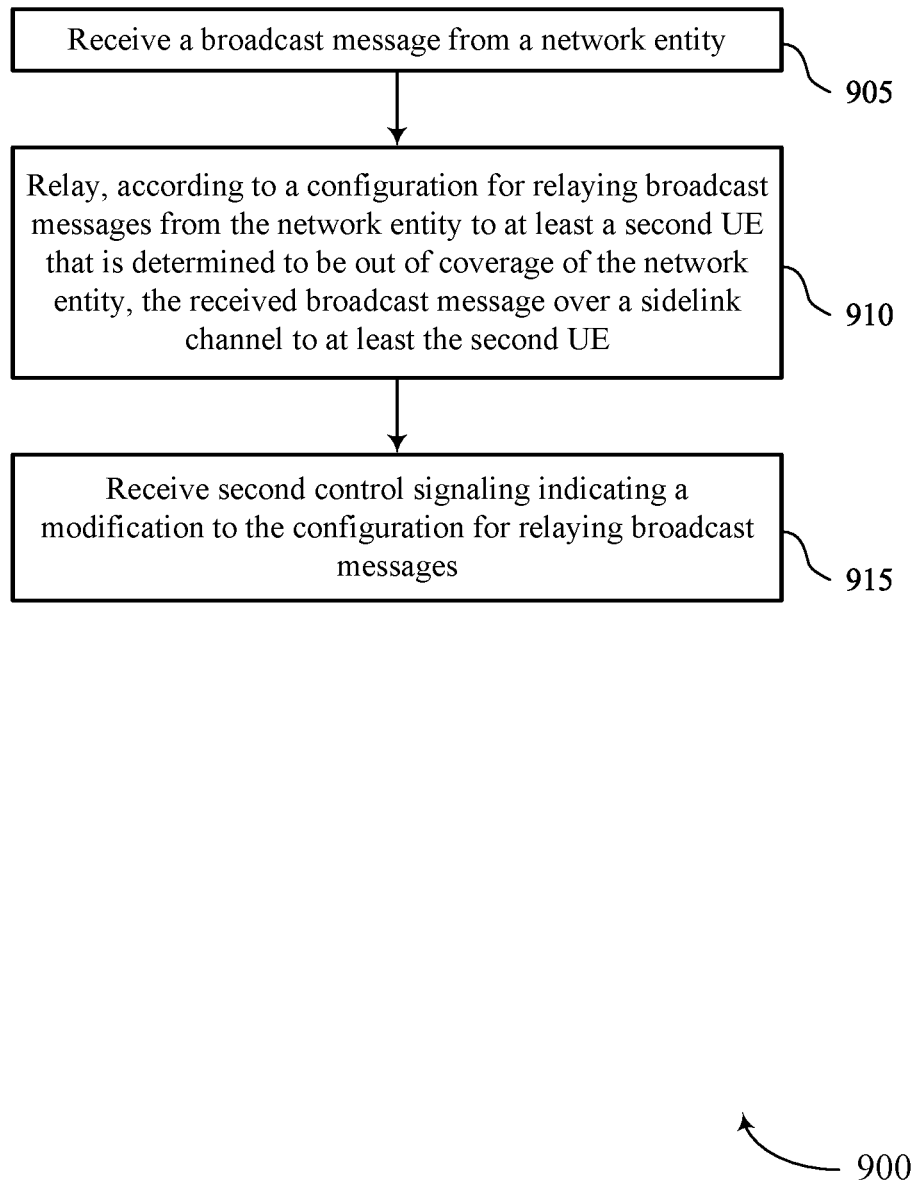

FIG. 9 shows a flowchart illustrating a method 900 that supports relaying broadcast messages to out-of-coverage user equipment in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving a broadcast message from a network entity. The operations of 905 may be performed in accordance with examples as disclosed herein. In some examples, aspects of the operations of 905 may be performed by a broadcast message receiver 625 as described with reference to FIG. 6.

At 910, the method may include relaying, according to a configuration for relaying broadcast messages from the network entity to at least a second UE that is determined to be out of coverage of the network entity, the received broadcast message over a sidelink channel to at least the second UE. The operations of 910 may be performed in accordance with examples as disclosed herein. In some examples, aspects of the operations of 910 may be performed by a broadcast relaying component 630 as described with reference to FIG. 6.

At 915, the method may include receiving second control signaling indicating a modification to the configuration for relaying broadcast messages. The operations of 915 may be performed in accordance with examples as disclosed herein. In some examples, aspects of the operations of 915 may be performed by a relay configuration modification component 655 as described with reference to FIG. 6.

Figure 10:
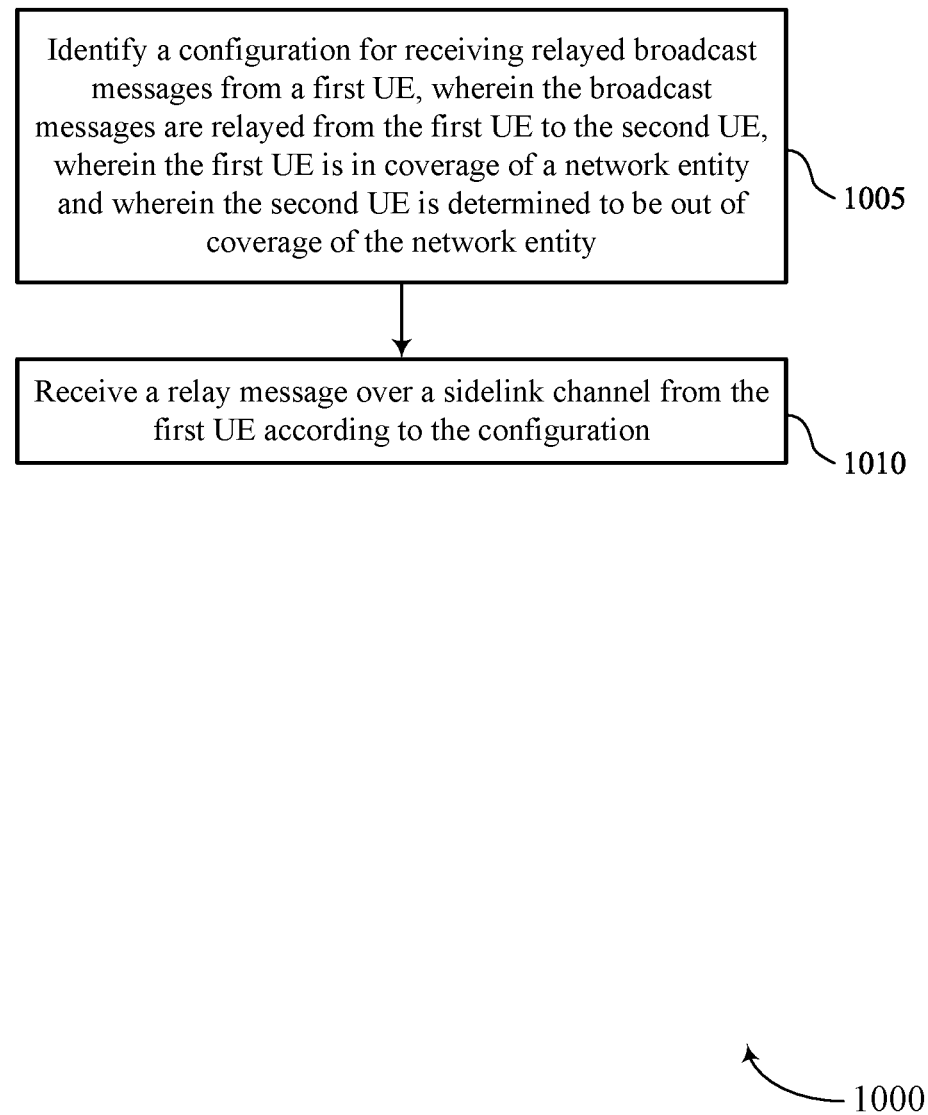

FIG. 10 shows a flowchart illustrating a method 1000 that supports relaying broadcast messages to out-of-coverage user equipment in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include identifying a configuration for receiving relayed broadcast messages from a first UE, where the broadcast messages are relayed from the first UE to the second UE, where the first UE is in coverage of a network entity and where the second UE is determined to be out of coverage of the network entity. The operations of 1005 may be performed in accordance with examples as disclosed herein. In some examples, aspects of the operations of 1005 may be performed by a relay configuration identification component 635 as described with reference to FIG. 6.

At 1010, the method may include receiving a relay message over a sidelink channel from the first UE according to the configuration. The operations of 1010 may be performed in accordance with examples as disclosed herein. In some examples, aspects of the operations of 1010 may be performed by a broadcast message receiver 625 as described with reference to FIG. 6.

The following provides an overview of aspects of the present disclosure:

Aspect 1: A method of wireless communications at a first UE, comprising: receiving a broadcast message from a network entity; and relaying, according to a configuration for relaying broadcast messages from the network entity to at least a second UE that is determined to be out of coverage of the network entity, the received broadcast message over a sidelink channel to at least the second UE.

Aspect 2: The method of aspect 1, wherein relaying the broadcast message comprises: transmitting, to at least the second UE, signaling comprising a groupcast message, a broadcast message, or both.

Aspect 3: The method of aspect 2, wherein the signaling comprises a medium access control-control element (MAC-CE) and the sidelink channel comprises a physical sidelink shared channel (PSSCH).

Aspect 4: The method of aspect 3, wherein the MAC-CE is multiplexed with other signaling over the PSSCH based at least in part on a configurable priority threshold.

Aspect 5: The method of any of aspects 2 through 4, wherein the signaling comprises a physical sidelink control channel (PSCCH) carrying sidelink control information (SCI) and a PSSCH message.

Aspect 6: The method of aspect 5, wherein the SCI indicates that the PSSCH message comprises a relayed broadcast message.

Aspect 7: The method of any of aspects 1 through 6, wherein relaying the broadcast message comprises: transmitting, to at least the second UE, signaling comprising a unicast message.

Aspect 8: The method of aspect 7, wherein the signaling comprises a PC5 RRC message over the sidelink channel and the sidelink channel comprises a physical sidelink control channel (PSCCH) and a physical sidelink shared channel (PSSCH).

Aspect 9: The method of any of aspects 1 through 8, wherein the broadcast message comprises an alert message.

Aspect 10: The method of any of aspects 1 through 9, wherein the broadcast message is indicated in an SIB or a master information block (MIB).

Aspect 11: The method of any of aspects 1 through 10, wherein the configuration for relaying broadcast messages from the network entity to at least the second UE is statically configured or semi-statically configured via RRC signaling.

Aspect 12: The method of any of aspects 1 through 11, further comprising: receiving DCI over a PDCCH that dynamically enables or disables for a duration relaying of broadcast messages from the network entity to at least the second UE.

Aspect 13: The method of any of aspects 1 through 12, further comprising: receiving control signaling indicating the configuration.

Aspect 14: The method of any of aspects 1 through 13, wherein the configuration is preconfigured at the UE.

Aspect 15: The method of any of aspects 1 through 14, further comprising: receiving second control signaling indicating a modification to the configuration for relaying broadcast messages.

Aspect 16: The method of aspect 15, wherein the second control signaling comprises a second medium access control-control element (MAC-CE) over a physical sidelink shared channel (PSSCH).

Aspect 17: The method of any of aspects 15 through 16, wherein the second control signaling comprises a second PC5 RRC message over a physical sidelink control channel (PSCCH) or a physical sidelink shared channel (PSSCH).

Aspect 18: The method of any of aspects 1 through 17, wherein receiving the configuration message is based at least in part on a first parameter indicating a location associated with the UE, a power parameter associated with the UE, or both.

Aspect 19: A method for wireless communications at a second UE, comprising: identifying a configuration for receiving relayed broadcast messages from a first UE, wherein the broadcast messages are relayed from the first UE to the second UE, wherein the first UE is in coverage of a network entity and wherein the second UE is determined to be out of coverage of the network entity; and receiving a relay message over a sidelink channel from the first UE according to the configuration.

Aspect 20: The method of aspect 19, wherein receiving the broadcast message comprises: receiving, from the first UE, signaling comprising a groupcast message, a broadcast message, or both.

Aspect 21: The method of aspect 20, wherein the signaling comprises a medium access control-control element (MAC-CE) and the sidelink channel comprises a physical sidelink shared channel (PSSCH).

Aspect 22: The method of aspect 21, wherein the MAC-CE is multiplexed with other signaling over the sidelink channel based at least in part on a configurable priority threshold, the sidelink channel corresponding to a physical sidelink shared channel (PSSCH).

Aspect 23: The method of any of aspects 19 through 22, wherein receiving the broadcast message comprises: receiving, from the first UE, signaling comprising a unicast message.

Aspect 24: The method of aspect 23, wherein the signaling comprises a PC5 RRC message over the sidelink channel and the sidelink channel comprises a physical sidelink control channel (PSCCH) and a physical sidelink shared channel (PSSCH).

Aspect 25: The method of any of aspects 19 through 24, wherein the broadcast message comprises an alert message.

Aspect 26: The method of any of aspects 19 through 25, wherein the broadcast message is indicated in an SIB or a master information block (MIB).

Aspect 27: An apparatus comprising a processor; memory coupled with the processor; and instructions stored in the memory and executable by the processor to cause the apparatus to perform a method of any of aspects 1 through 18.

Aspect 28: An apparatus comprising at least one means for performing a method of any of aspects 1 through 18.

Aspect 29: A non-transitory computer-readable medium storing code the code comprising instructions executable by a processor to perform a method of any of aspects 1 through 18.

Aspect 30: An apparatus for wireless communications at a second UE, comprising a processor; memory coupled with the processor; and instructions stored in the memory and executable by the processor to cause the apparatus to perform a method of any of aspects 19 through 26.

Aspect 31: An apparatus for wireless communications at a second UE, comprising at least one means for performing a method of any of aspects 19 through 26.

Aspect 32: A non-transitory computer-readable medium storing code for wireless communications at a second UE, the code comprising instructions executable by a processor to perform a method of any of aspects 19 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communications at a first user equipment (UE), comprising:
  receiving a broadcast message from a network entity;
  receiving a configuration based at least in part on a first parameter indicating a location associated with the first UE, a power parameter associated with the first UE, or both; and
  relaying, according to the configuration for relaying broadcast messages from the network entity to at least a second UE that is determined to be out of coverage of the network entity, the received broadcast message over a sidelink channel to at least the second UE.

2. The method of claim 1, wherein relaying the broadcast message comprises:
  transmitting, to at least the second UE, signaling comprising a groupcast message, a broadcast message, or both.

3. The method of claim 2, wherein the signaling comprises a medium access control-control element (MAC-CE) and the sidelink channel comprises a physical sidelink shared channel (PSSCH).

4. The method of claim 3, wherein the MAC-CE is multiplexed with other signaling over the PSSCH based at least in part on a configurable priority threshold.

5. The method of claim 2, wherein the signaling comprises a physical sidelink control channel (PSCCH) carrying sidelink control information (SCI) and a PSSCH message.

6. The method of claim 5, wherein the SCI indicates that the PSSCH message comprises a relayed broadcast message.

7. The method of claim 1, wherein relaying the broadcast message comprises:
  transmitting, to at least the second UE, signaling comprising a unicast message.

8. The method of claim 7, wherein the signaling comprises a PC5 radio resource control (RRC) message over the sidelink channel and the sidelink channel comprises a physical sidelink control channel (PSCCH) and a physical sidelink shared channel (PSSCH).

9. The method of claim 1, wherein the broadcast message comprises an alert message.

10. The method of claim 1, wherein the broadcast message is indicated in a system information block (SIB) or a master information block (MIB).

11. The method of claim 1, wherein the configuration for relaying broadcast messages from the network entity to at least the second UE is statically configured or semi-statically configured via radio resource control (RRC) signaling.

12. The method of claim 1, further comprising:
  receiving downlink control information (DCI) over a physical downlink control channel (PDCCH) that dynamically enables or disables for a duration relaying of broadcast messages from the network entity to at least the second UE.

13. The method of claim 1, further comprising:
  receiving control signaling indicating the configuration.

14. The method of claim 1, wherein the configuration is preconfigured at the first UE.

15. The method of claim 1, further comprising:
  receiving second control signaling indicating a modification to the configuration for relaying broadcast messages.

16. The method of claim 15, wherein the second control signaling comprises a second medium access control-control element (MAC-CE) over a physical sidelink shared channel (PSSCH).

17. The method of claim 15, wherein the second control signaling comprises a second PC5 radio resource control (RRC) message over a physical sidelink control channel (PSCCH) or a physical sidelink shared channel (PSSCH).

18. A method for wireless communications at a second user equipment (UE), comprising:
  receiving a configuration for receiving relayed broadcast messages from a first UE, wherein the broadcast messages are relayed from the first UE to the second UE, wherein the first UE is in coverage of a network entity and wherein the second UE is determined to be out of coverage of the network entity, wherein the configuration includes signaling comprising a medium access control-control element (MAC-CE); and receiving a relay message over a sidelink channel from the first UE according to the configuration, wherein the sidelink channel comprises a physical sidelink shared channel (PSSCH), wherein the MAC-CE is multiplexed with other signaling over the PSSCH based at least in part on a configurable priority threshold.

19. The method of claim 18, wherein the broadcast messages comprise a groupcast message, a broadcast message, or both.

20. The method of claim 18, wherein the broadcast messages comprise a unicast message.

21. The method of claim 18, wherein the signaling comprises a PC5 radio resource control (RRC) message over the sidelink channel and the sidelink channel comprises a physical sidelink control channel (PSCCH) and a physical sidelink shared channel (PSSCH).

22. The method of claim 18, wherein the broadcast messages comprise an alert message.

23. The method of claim 18, wherein the broadcast messages are indicated in a system information block (SIB) or a master information block (MIB).

24. An apparatus, comprising:
a processor;
memory coupled with the processor; and
instructions stored in the memory and executable by the processor to cause the apparatus to:
receive a broadcast message from a network entity;
receive a configuration message based at least in part on a first parameter indicating a location associated with the first UE, a power parameter associated with the first UE, or both; and
relay, according to the configuration for relaying broadcast messages from the network entity to at least a second UE that is determined to be out of coverage of the network entity, the received broadcast message over a sidelink channel to at least the second UE.

25. The apparatus of claim 24, wherein the instructions to relay the broadcast message are executable by the processor to cause the apparatus to:

transmit, to at least the second UE, signaling comprising a groupcast message, a broadcast message, or both.

26. The apparatus of claim 25, wherein the signaling comprises a medium access control-control element (MAC-CE) and the sidelink channel comprises a physical sidelink shared channel (PSSCH).

27. An apparatus for wireless communications at a second user equipment (UE), comprising:
a processor;
memory coupled with the processor; and
instructions stored in the memory and executable by the processor to cause the apparatus to:
receive a configuration for receiving relayed broadcast messages from a first UE, wherein the broadcast messages are relayed from the first UE to the second UE, wherein the first UE is in coverage of a network entity and wherein the second UE is determined to be out of coverage of the network entity, wherein the configuration includes signaling comprising a medium access control-control element (MAC-CE); and
receive a relay message over a sidelink channel from the first UE according to the configuration, wherein the sidelink channel comprises a physical sidelink shared channel (PSSCH), wherein the MAC-CE is multiplexed with other signaling over the PSSCH based at least in part on a configurable priority threshold.

* * * * *